United States Patent
Mallick (10) Patent No.: US 11,423,059 B2
(45) Date of Patent: Aug. 23, 2022

(54) SYSTEM AND METHOD FOR RESTRICTIVE CLUSTERING OF DATAPOINTS

(71) Applicant: Innoplexus AG, Eschborn (DE)

(72) Inventor: Shubhojit Mallick, New Delhi (IN)

(73) Assignee: Innoplexus AG, Eschborn (DE)

(*) Notice: Subject to any disclaimer, the term of this patent is extended or adjusted under 35 U.S.C. 154(b) by 372 days.

(21) Appl. No.: 16/525,987

(22) Filed: Jul. 30, 2019

(65) Prior Publication Data
US 2021/0034648 A1 Feb. 4, 2021

(51) Int. Cl.
*G06F 16/28* (2019.01)
*G06F 16/22* (2019.01)
*G06N 20/00* (2019.01)

(52) U.S. Cl.
CPC ........ *G06F 16/287* (2019.01); *G06F 16/2264* (2019.01); *G06N 20/00* (2019.01)

(58) Field of Classification Search
CPC .. G06F 16/906; G06F 16/2264; G06F 16/287; G06N 20/00; G06N 3/084
USPC .......................................................... 707/738
See application file for complete search history.

(56) References Cited

U.S. PATENT DOCUMENTS

| | | | |
|---|---|---|---|
| 8,363,961 B1* | 1/2013 | Avidan | G06K 9/6218 707/747 |
| 9,710,493 B2* | 7/2017 | Wang | G06F 16/35 |
| 2019/0095992 A1* | 3/2019 | Soh | G07F 19/20 |
| 2019/0122252 A1* | 4/2019 | Cetintas | G06Q 30/0277 |

\* cited by examiner

*Primary Examiner* — Kuen S Lu
(74) *Attorney, Agent, or Firm* — Ziegler IP Law Group, LLC (57) ABSTRACT

Disclosed is a system for restrictive clustering of datapoints. The system comprises server arrangement that acquires data record for performing clustering operation, determines datapoints for the data record, plots the datapoints in a multi-dimensional space, determines a cluster threshold, and performs a first iteration of clustering on the datapoints plotted in the multi-dimensional space, determines a segment threshold for the datapoints plotted in the multi-dimensional space, derives boundary conditions for determining segments based on the segment threshold and superimposes the boundary conditions corresponding to each of the segments based on the segment threshold onto the first iteration of clustering. Moreover, the server arrangement re-iterates the first iteration of clustering to obtain a second iteration of clustering, wherein the second iteration of clustering has an error value lower than an error value for the first iteration of clustering.

10 Claims, 3 Drawing Sheets

SYSTEM AND METHOD FOR RESTRICTIVE CLUSTERING OF DATAPOINTS

TECHNICAL FIELD

The present disclosure relates generally to data processing; and more specifically, to systems and methods for restrictive clustering of datapoints. Moreover, the present disclosure also relates to computer program products comprising non-transitory computer-readable storage media having computer-readable instructions stored thereon, the computer-readable instructions being executable by a computerized device comprising processing hardware to execute aforementioned methods.

BACKGROUND

With advancement in digital technology, there has been an exponential increase in amounts of data stored digitally across multiple locations. Such digitally stored data is analyzed to derive meaningful insights that further drives operations such as business intelligence, decision making, data crunching, forecasting, planning, and so forth. Additionally, clustering of data into groups (namely, segments) play an imperative role in such analysis of data by grouping objects of similar kind into respective categories.

Typically, conventional systems for clustering of datapoints require huge amounts of human intervention for deciding, for example, how many clusters should be formed, parameters for clustering, and how to perform clustering operation. Such human intervention is beneficial when a dataset for clustering is small. However, when clustering large amounts of data, a human cannot possibly analyze such large dataset to determine, for example the aforesaid parameters.

Recently, machine learning algorithms are increasingly employed for clustering of dataset. Notably, clustering algorithms such as hierarchical clustering algorithm, k-means clustering algorithm, Expectation Maximization clustering algorithm, and two-way joining algorithm are employed for unsupervised clustering of large datasets. However, the machine learning algorithms such as k-means clustering algorithm operates to include incorrect datapoints from the dataset, in initial iterations thereof. Such inclusion of incorrect datapoints makes the process compute-intensive and time-intensive. Moreover, such unsupervised clustering of the large datasets requires the clustering algorithms to perform numerous iterations that consume significantly large amount of energy, power and time for providing optimal output, thereby making such process increasingly compute-intensive and time-intensive.

Therefore, in light of the foregoing discussion, there exists a need to overcome the aforementioned drawbacks associated with the conventional systems for clustering of datasets.

SUMMARY

The present disclosure seeks to provide a system for restrictive clustering of datapoints. The present disclosure also seeks to provide a method for restrictive clustering of datapoints. The present disclosure seeks to provide a solution to the existing problem of compute-intensive algorithms employed for clustering of datapoints. An aim of the present disclosure is to provide a solution that overcomes at least partially the problems encountered in prior art, and provides a system that substantially reduces iterations for clustering of datapoints by superimposing boundary conditions on such clustering algorithms.

In one aspect, an embodiment of the present disclosure provides a system for restrictive clustering of datapoints, wherein the system comprises:
  a database arrangement; and
  a server arrangement communicably coupled via a data communication network to the database arrangement, wherein the server arrangement comprises:
    an extraction module, that when operated, acquires at least one data record for performing clustering operation thereupon, from the database arrangement;
    a mapping module, that when operated, determines a set of datapoints for the at least one data record, and plots the set of datapoints in a multi-dimensional space;
    a clustering module, that when operated:
      determines a cluster threshold based on iterative operation of the clustering module; and
      performs a first iteration of clustering on the set of datapoints plotted in the multi-dimensional space;
    a regression module, that when operated:
      determines a segment threshold for the set of datapoints plotted in the multi-dimensional space, based on iterative operation of the regression module; and
      derives a set of boundary conditions for determining segments based on the segment threshold; and
    a restrictive clustering module, that when operated:
      superimposes the set of boundary conditions corresponding to each of the segments based on the segment threshold onto the first iteration of clustering, on the set of datapoints; and
      re-iterates the first iteration of clustering to obtain a second iteration of clustering, wherein the second iteration of clustering has an error value lower than an error value for the first iteration of clustering.

In another aspect, an embodiment of the present disclosure provides a method for supervised clustering of datapoints, the method is implemented using a system comprising a server arrangement communicably coupled via a data communication network to a database arrangement, wherein the method comprises:
  acquiring at least one data record for performing clustering operation thereupon from the database arrangement;
  determining a set of datapoints for the at least one data record;
  plotting the set of datapoints in a multi-dimensional space;
  determining, a cluster threshold;
  performing a first iteration of clustering on the set of datapoints plotted in the multi-dimensional space;
  determining a segment threshold for the set of datapoints plotted in the multi-dimensional space;
  deriving a set of boundary conditions for determining segments based on the segment threshold;
  superimposing the set of boundary conditions corresponding to each of the segments based on the segment threshold onto the first iteration of clustering on the set of datapoints;
  re-iterating the first iteration of clustering to obtain a second iteration of clustering, wherein the second iteration of clustering has an error value lower than an error value for the first iteration of clustering.

In yet another aspect, an embodiment of the present disclosure provides a computer program product comprising non-transitory computer-readable storage media having computer-readable instructions stored thereon, the computer-readable instructions being executable by a computerized device comprising processing hardware to execute aforesaid method.

Embodiments of the present disclosure substantially eliminate or at least partially address the aforementioned problems in the prior art, and enables restrictive clustering of datapoints by superimposing boundary conditions thereby making process of clustering less compute-intensive, and further determines such boundary conditions without human intervention thereby allowing supervised operation for clustering of datapoints without any human intervention.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for restrictive clustering of datapoints, wherein the system comprises:
 a database arrangement; and
 a server arrangement communicably coupled via a data communication network to the database arrangement, wherein the server arrangement comprises:
  an extraction module, that when operated, acquires at least one data record for performing clustering operation thereupon, from the database arrangement;
  a mapping module, that when operated, determines a set of datapoints for the at least one data record, and plots the set of datapoints in a multi-dimensional space;
  a clustering module, that when operated:
   determines a cluster threshold based on iterative operation of the clustering module; and
   performs a first iteration of clustering on the set of datapoints plotted in the multi-dimensional space;
  a regression module, that when operated:
   determines a segment threshold for the set of datapoints plotted in the multi-dimensional space, based on iterative operation of the regression module; and
   derives a set of boundary conditions for determining segments based on the segment threshold; and
  a restrictive clustering module, that when operated:
   superimposes the set of boundary conditions corresponding to each of the segments based on the segment threshold onto the first iteration of clustering, on the set of datapoints; and
   re-iterates the first iteration of clustering to obtain a second iteration of clustering, wherein the second iteration of clustering has an error value lower than an error value for the first iteration of clustering.

In another aspect, an embodiment of the present disclosure provides a method for supervised clustering of datapoints, the method is implemented using a system comprising a server arrangement communicably coupled via a data communication network to a database arrangement, wherein the method comprises:
 acquiring at least one data record for performing clustering operation thereupon from the database arrangement;
 determining a set of datapoints for the at least one data record;
 plotting the set of datapoints in a multi-dimensional space;
 determining, a cluster threshold;
 performing a first iteration of clustering on the set of datapoints plotted in the multi-dimensional space;
 determining a segment threshold for the set of datapoints plotted in the multi-dimensional space;
 deriving a set of boundary conditions for determining segments based on the segment threshold;
 superimposing the set of boundary conditions corresponding to each of the segments based on the segment threshold onto the first iteration of clustering on the set of datapoints;
 re-iterating the first iteration of clustering to obtain a second iteration of clustering, wherein the second iteration of clustering has an error value lower than an error value for the first iteration of clustering.

In yet another aspect, an embodiment of the present disclosure provides a computer program product comprising non-transitory computer-readable storage media having computer-readable instructions stored thereon, the computer-readable instructions being executable by a computerized device comprising processing hardware to execute aforesaid method The system for restrictive clustering of datapoints as described herein proffers a platform that optimally clusters the set of datapoints in the multi-dimensional space to enable processing of such clusters to perform operations and derive insights therefrom. Specifically, the system introduces boundary conditions based on regression analysis, onto the first iteration of clustering so as to restrict operations (namely, iterations) to be performed for clustering, thereby minimizing a number of iterations performed by unsupervised machine learning algorithms. Beneficially, such substantial reduction in the number of iterations performed for clustering of datapoints by the unsupervised machine learning algorithms overcomes drawbacks associated with unsupervised machine learning algorithms owing to time-intensive and compute-intensive operation thereof. Subsequently, the system reduces time of operation, processing power required, and memory required for clustering of datapoints by the unsupervised machine learning algorithms and further enhances operational characteristics of a computer where the aforesaid system is implemented. Moreover, beneficially, the system derives the boundary conditions based on mathematical analysis of datapoints. Such boundary conditions are utilized for supervised training of the unsupervised machine learning algorithms. Subsequently, human intervention for optimization of unsupervised machine learning algorithms is substantially reduced thereby reducing errors pertaining to human biases. Therefore, the system for restrictive clustering operates to cluster large pools of datapoints by employing minimal iterations of unsupervised machine learning algorithms without employing human intervention and/or labelled data, thereby enabling reliable and optimal clustering of datapoints.

The system for restrictive clustering of datapoints proffers a system that performs a task of dividing a plurality of datapoints into a number of groups. In this regard, a datapoints in a given group is more similar to other datapoints in the given group than datapoints in group other than the given group. In other words, clustering of datapoints refer to sorting datapoints into groups in a way that a degree of association between two datapoints is maximal if they belong to a same group and minimal otherwise. It will be appreciated that such clustering of datapoints may be used for, for example, documents classification, customer segmentation, segmentation of geographical areas (based on parameters such as crime, water, resources, and so forth), fraud detection (in sectors such as automobile, healthcare, insurance, and so forth), cyber-profiling of individuals (such as criminals), and analysis of consumer-based data (based on, for example, needs, interests, and so forth).

Optionally, the system is implemented by way of a trusted software application that is executed on a computing device to perform supervised clustering. In such a case, the trusted software application is received (for example, downloaded) from the server arrangement or a trusted third party. The trusted third party can be a publicly-accessible digital distribution platform, for example, such as Google Play®, the App Store® (for iOS®) and the like.

The system comprises the database arrangement. The term "database arrangement" refers to a collection of data that allows easy access, management and updating of the data stored. The database arrangement can be broadly construed to comprise a plurality of databases therein, wherein the data is stored in the plurality of databases. Optionally, the data in the database arrangement is organized into rows, columns, and tables. Additionally, optionally, the data in the database arrangement is indexed (namely, labeled) for easy access thereto. Optionally, the database arrangement comprises a set of processes (namely instructions) to create the plurality of databases and update thereto, query data from external sources, and process operational instructions provided thereto. Optionally, the database arrangement is accessed electronically for, for example storing data, accessing data, and updating data, using a computing device. More optionally, such computing device employs a database management system (DBMS) for creating and managing the database arrangement. Furthermore, optionally, the database arrangement is object-oriented database, SQL database, relational database, distributed database, non-SQL database, cloud database.

Moreover, the term "data communication network" refers to individual networks, or a collection thereof interconnected with each other and functioning as a single large network. Optionally, such data communication network is implemented by way of wired communication network, wireless communication network, or a combination thereof. It will be appreciated that physical connection is established for implementing the wired communication network, whereas the wireless communication network is implemented using electromagnetic waves. Examples of such data communication network include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, fifth generation (5G) telecommunication networks and Worldwide Interoperability for Microwave Access (WiMAX) networks.

Optionally, the data communication network is implemented as a cellular network. It will be appreciated that the cellular network refers to a radio communication network, wherein the cellular network is distributed over land through cells. Specifically, each cell includes a fixed location transceiver, for example, a base station.

Furthermore, the system comprises the server arrangement communicably coupled via the data communication network to the database arrangement. The term "server arrangement" refers to a structure and/or module that include programmable and/or non-programmable components configured to store, process and/or share information. Optionally, the server arrangement includes any arrangement of physical or virtual computational entities capable of enhancing information to perform various computational tasks. Furthermore, it will be appreciated that the server arrangement may be both single hardware server and/or a plurality of hardware servers operating in a parallel or a distributed architecture. In an example, the server may include components such as a memory, a processor, a network adapter and the like, to store, process and/or share information with other computing components, such as a user device. Optionally, the server is implemented as a computer program that provides various services (such as database service) to other devices, modules or apparatus.

It will be appreciated that the aforesaid system and the aforesaid method is not limited to perform supervised clustering on a plurality of data records for, for example, data classification based. In an instance, the aforesaid system can be employed for clustering of data inside a given data record, wherein the given data record comprises labels or sections therein. Additionally, the data comprised in the given data record may be, for example, biological data (such as gene sequences, gene variants, relations between gene variants and phenotypes, and so forth), bio-medical data, marketing data, financial data (such as sales, profits, and so forth), statistical data (such as, population, growth rate, and so forth), geo-spatial data.

Specifically, data records refer to a set of files in which an observation made for example, an incident, a quantitative analysis, and a qualitative analysis, is recorded, wherein the observation is recorded in a form of one or more types of data. Some examples of various types of data are text data, tabular data, image data, video data and audio data. Thus, the data records can be in any suitable file formats depending upon the type of data that is stored therein. As an example, the set of files could comprise a single file having one or more of: a written text, one or more tables, one or more graphs, or a set of images. As another example, the set of files could comprise a plurality of files having different types of data, for example, such as a written text, one or more tables, one or more graphs, a set of images, one or more videos, or one or more audio clips.

The server arrangement comprises the extraction module that when operated, acquires at least one data record for performing clustering operation thereupon, from the database arrangement. The extraction module refers to a module comprising programmable components that is stored in the server arrangement. The extraction module queries the database arrangement to obtain the at least one data record. It will be appreciated that the at least one data record to be acquired is decided based on an analysis to be performed. In this regard, the extraction module may be operated by a user of the system, wherein the user is a person or a bot. Optionally, the remote extraction module is implemented by way of a software application that provides a user interface on a user device operated by the user, wherein the user selects for example, the at least one data record, or a category of analysis to be performed based on the supervised clustering of the system.

In an example, the user, via the user interface of the extraction module provided on the user device, selects the at least one data record for clustering thereof, that is further acquired by the extraction module from the database arrangement. In another example, the user, via the user interface of the extraction module provided on the user device, provides (namely, uploads) the at least one data record for clustering thereof. In yet another example, the user selects a category of analysis as customers segmentation for a geographical area. In such case, the extraction module identifies and further acquires the at least one data record to be analyzed from the database arrangement, wherein the at least one data record provides information (such as, age, gender, spending habits, interests, and the likes) relating to a plurality of consumers in the geographical area.

Optionally, machine learning algorithms are employed by at least one of the: extraction module, mapping module, clustering module, regression module, restrictive clustering module. Throughout the present disclosure, the term "machine learning algorithms" refer to a category of operational instructions (namely, algorithms) employed to facilitate operation of, for example, a software application. The machine learning algorithms allows the software applications to become more accurate in predicting outcomes and/or performing tasks, without being explicitly programmed. Typically, the software application is a set of instructions executable by a computer or other digital system so as to configure the computer or the digital system to perform a task. Specifically, the machine learning algorithms are employed to artificially train the software applications so as to enable them to automatically learn, from analyzing training dataset and improving performance from experience, without being explicitly programmed.

Optionally, the software application, employing the machine learning algorithms, is trained using a training dataset. More optionally, the software application may be trained using different types of machine learning algorithms, depending upon the training dataset employed. Typically, examples of the different types of machine learning algorithms, depending upon the training dataset employed for training the software application comprise, but are not limited to: supervised machine learning algorithms, unsupervised machine learning algorithms, semi-supervised learning algorithms, and reinforcement machine learning algorithms. Furthermore, the software application is trained by interpreting patterns in the training dataset and adjusting the machine learning algorithms accordingly to get a desired output.

In this regard, the extraction module employs the machine learning algorithms to identify the at least one document for analysis, when the at least one document is not explicitly provided, specified or selected by the user or any other external source.

The server arrangement comprises the mapping module, that when operated, determines the set of datapoints for the at least one data record, and plots the set of datapoints in the multi-dimensional space. The at least one data record acquired by the extraction module is provided to the mapping module. The mapping module refers to a module comprising programmable components that is stored in the server arrangement. The mapping module extracts analytical data from each of the at least one data record, wherein analytical data summarizes a data record corresponding thereto. Optionally, analytical data for a data record comprises quantitative data in form of, for example, charts, tables, diagrams, and so forth. More optionally, analytical data for a data record comprises a plurality of tokens associated with information stored therein, wherein the plurality of tokens are extracted by employing for example, an ontology. Furthermore, the analytical data is analyzed to generate the set of datapoints. Additionally, optionally, the mapping module operates based on a type of data (for example, text, image, audio, graphs, and so forth) stored in a given data record. Optionally, the mapping module effectively separates overlapping content (for example, repeated text, repeated image, repeated table, and the likes) in a given data record to identify set of data points for the given data record.

Additionally, the mapping module plots the extracted set of datapoints in the multi-dimensional space. Optionally, the multi-dimensional space is a two-dimensional space (2D), a three-dimensional space (3D), a four-dimensional space (4D), and so forth. Specifically, the multi-dimensional space is plotted to depict a variation of at least one dependent variable against a variation of an independent variable. It will be appreciated that an axis in the multi-dimensional space represents the independent variable and other axis/axes in the multi-dimensional space represent the at least one dependent variable. Moreover, the set of datapoints provide values relating to such variation of the at least one dependent variable against the independent variable.

Moreover, optionally, the mapping module employs the machine learning algorithms to efficiently identify identical data in the at least one document, and further extract the set of datapoints from the analytical data. Additionally, the machine learning algorithms are employed to train the mapping module to identify the independent variable and the at least one dependent variable to plot the set of datapoints in the multi-dimensional space, without being explicitly programmed.

It will be appreciated that the plot of datapoints in the multi-dimensional space depends on a relation between the datapoints. In an instance, the plot of the set of datapoints in the multi-dimensional space is linear. In another instance, the plot of the set of datapoints in the multi-dimensional space is non-linear.

The server arrangement comprises the clustering module, that when operated:
  determines the cluster threshold based on iterative operation of the clustering module, and
  performs the first iteration of clustering on the set of datapoints plotted in the multi-dimensional space.

In this regard, the clustering module is operable to cluster the plotted set of datapoints into the multi-dimensional space, in at least one cluster. Moreover, the term 'cluster threshold' refers to a number of clusters into which the set of datapoints is to be segmented, for optimal throughput of the system. Moreover, the clustering module determines the cluster threshold based on iterative operation thereof. Specifically, the cluster threshold corresponds to an optimal output of the clustering module. In an example, the clustering module predicts an efficiency of the clustering module by employing a predictive analysis technique. Examples of the predictive analysis technique employed by the clustering module may include, but are not limited to, elbow method, average silhouette method, gap statistic method, R code method. Optionally, the clustering module employs a validation technique to validate cluster threshold determined.

Furthermore, the clustering module performs the first iteration to cluster the plotted set of datapoints into at least one cluster. In an instance, the first iteration of clustering is performed using unsupervised machine learning algorithms. In another instance, the first iteration of clustering is performed using supervised machine learning algorithms. Moreover, it will be appreciated that the first iteration performed by the clustering module may not effectively cluster the set of datapoints, owing to several iterations required for training of the machine learning algorithms.

Optionally, the clustering module, employing the machine learning algorithms, employs k-means algorithm for operation thereof. More optionally, the k-means algorithm is implemented as unsupervised machine learning algorithms. Pursuant to embodiments of the present disclosure, upon determination of the cluster threshold, the clustering module operates to group (namely, cluster) the plotted set of datapoints, wherein each cluster has a given cluster center. Moreover, the k-means algorithm randomly elects the cluster centers for the plotted set of datapoints based on the cluster threshold. In this regard, a number of cluster center corresponds to the cluster threshold. Subsequently, the k-means algorithm works iteratively based on a distance of a given datapoint from the cluster centers.

In an instance, the cluster threshold is '3'. In such case, for a first iteration, the k-means algorithm randomly elects a first set of datapoints from the plotted set of datapoints as a first cluster center, a second cluster center and a third cluster center. In such case, the k-means algorithm measures a first distance of a given datapoint from the first cluster center, a second distance of the given datapoint from the second cluster center, and a third distance of the given datapoint from the third cluster center. Subsequently, the given datapoint is assigned to a cluster center from the first set of datapoints, from where a distance of the given datapoint is shortest. Similarly, each of the plotted set of datapoints is assigned to a cluster center from the first set of datapoints. In such example, the clustering module further randomly elects a second set of datapoints from the plotted set of datapoints so as to repeat such operation of assigning each of the plotted set of datapoints to a cluster center from the second set of datapoints. Subsequently, the k-means algorithm determines an optimal set of datapoints, wherein the set of datapoints specify cluster centers for optimal operation of the clustering module.

Optionally, such distance between a given datapoint and a cluster center is measure using techniques, for example, Euclidean distance technique, squared Euclidean distance technique, Chebychev distance technique, power distance technique, and Manhattan distance technique. More optionally, the clustering module assigns a weight to each of clusters generated in the first iteration of the clustering, wherein the weight is a quantitative value that represent a reliability for a cluster. In this regard, optionally, a cluster having more number of datapoints assigned thereto is assigned a larger weight than a cluster having lesser number of datapoints assigned thereto.

The server arrangement comprises the regression module, that when operated:
  determines the segment threshold for the set of datapoints plotted in the multi-dimensional space, based on iterative operation of the regression module, and
  derives the set of boundary conditions for determining segments based on the segment threshold.

In this regard, the regression module is operable to analyze the plotted set of datapoints to derive insights therefrom. Specifically, mathematical analysis is performed onto the plotted set of datapoints. Moreover, the term 'segment threshold' refers to a number of segments into which the plotted set of datapoints is to be divided, for optimal throughput of the system. Moreover, the regression module determines the segment threshold based on iterative operation thereof. Specifically, the segment threshold corresponds to an optimal output of the regression module. In an example, the regression module predicts an efficiency of the regression module by employing a predictive analysis technique. Examples of the predictive analysis technique employed by the regression module may include, but are not limited to, elbow method, average silhouette method, gap statistic method, R code method. Optionally, the regression module employs a validation technique to validate the segment threshold determined. Moreover, optionally, the segment threshold is determined based on a nature (namely, shape) of the plotted set of datapoints in the multi-dimensional space.

Furthermore, the regression module derives the set of boundary conditions for determining segments based on the segment threshold. In an instance, the set of boundary conditions for the segments is performed using unsupervised machine learning algorithms. In another instance, the set of boundary conditions for the segments is performed using supervised machine learning algorithms. Specifically, a 'boundary condition' for a given segment refers to a analytical condition that is required to be satisfied at all or part of boundary region of the given segment. Optionally, a segment has at least two boundary conditions, wherein a first boundary condition defines a lower limit of boundary and a second boundary condition defines an upper limit of boundary. Optionally, the set of boundary conditions are implemented as a mathematical equation that comprises at least one segment therein. moreover, each of segments based on the segment threshold defined using the set of boundary conditions is represented using different mathematical equation.

Optionally, the regression module, employing the machine learning algorithms, employs spline regression algorithm for operation thereof. More optionally, the splice regression algorithm is implemented as unsupervised machine learning algorithms. Pursuant to embodiments of the present disclosure, upon determination of the segment threshold, the clustering module operates to divide (namely, segment) the set of plotted datapoints, wherein each segment has at least two boundary conditions defining it. Moreover, such segmentation of the set of datapoints is performed based on a slope between two datapoints. In this regard, the regression module determines a slope between two datapoints, wherein a second datapoint is a subsequent datapoint to a first datapoint. Moreover, datapoints having similar slopes in continuity are assigned as a segment in the plot in the multi-dimensional space.

In an instance, the set of datapoints are plotted in the multi-dimensional space as a cubic polynomial. In such case, the segment threshold is determined to be '3'. Optionally, the regression module matches a slope between two datapoints from the set of datapoints to determine if the two datapoints will be comprised in a same segment. Subsequently, the set of datapoints are divided into three segments, wherein each segment is contained inside a lower boundary condition and an upper boundary condition. Moreover, in an instance, an upper boundary condition of a first segment may overlap or nearly overlap with a lower boundary condition of a second segment. Similarly, an upper boundary condition of the second segment may overlap or nearly overlap with a lower boundary condition of a third segment. Additionally, the first segment comprises datapoints from the set of datapoints having a first positive slope, the second segment comprises datapoints from the set of datapoints having a negative slope, and further the third segment comprises datapoints from the set of datapoints having a second positive slope. Moreover, the regression module further represents datapoints comprised in a given segment by way of a mathematical equation.

The server arrangement comprises the restrictive clustering module, that when operated:
 superimposes the set of boundary conditions corresponding to each of the segments based on the segment threshold onto the first iteration of clustering, on the set of datapoints, and
 re-iterates the first iteration of clustering to obtain the second iteration of clustering, wherein the second iteration of clustering has the error value lower than the error value for the first iteration of clustering.

Herein above, the restrictive clustering module refers to a module comprising programmable components that is stored in the server arrangement. Moreover, the restrictive clustering module superimposes the set of boundary conditions onto the first iteration of clustering, so as to enable supervised operation of the clustering module. Moreover, the multi-dimensional space is represented by way of the segment and such segments are analyzed to determine clusters therefrom. Optionally, the set of boundary conditions implemented as mathematical equations are imposed on the first iteration of clustering in the multi-dimensional space.

Furthermore, the restrictive clustering module re-iterates the first iteration of clustering. Specifically, based on the set of boundary conditions that defines the segments determined, the restrictive clustering module determines clusters to be formed from the set of datapoints in the multi-dimensional space. It will be appreciated that the cluster centers in the first iteration of clustering are randomly elected by the clustering module. Subsequently, such clustering of the set of datapoints is not optimal. Therefore, the restrictive clustering module super-imposes the set of boundary conditions that defines the segments onto the first iteration of clustering in the multi-dimensional space. Such super-imposing enables identification of precise cluster centers for the clustering of the set of datapoints. Subsequently, based on the cluster threshold and the segments defined by the set of boundary conditions, the restrictive clustering module identifies optimal cluster centers, wherein the optimal cluster centers are close to ideal cluster centers for the set of datapoints. Additionally, the second iteration is performed to assign each of the set of datapoints to a cluster center from the optimal cluster centers.

Optionally, the set of datapoints are plotted non-linearly in the multi-dimensional space. The set of boundary conditions super-imposed on the multi-dimensional space is used to assign each datapoint from the set of datapoints into a cluster. In an instance, the restrictive clustering module identifies a datapoint from each of the segments defined by the set of boundary conditions, as optimal cluster centers. In another instance, the restrictive clustering module identifies a datapoint lying on each of the set of boundary conditions as optimal cluster centers. Subsequently, the second iteration of clustering is performed by the restrictive clustering module.

Moreover, optionally, the restrictive clustering module employs the clustering module to perform the second iteration of clustering. Optionally, the restrictive clustering module super-imposes the set of boundary conditions onto the first iteration of clustering to provide labeled dataset to the clustering module employing unsupervised machine learning algorithms. Subsequently, the clustering module is trained using the set of boundary conditions to perform optimal clustering of the set of datapoints. It will be appreciated that the set of boundary conditions are derived by, for example mathematical analysis. Such complex mathematical analysis is performed without human intervention by the regression module, thereby reducing any chances of error.

Optionally, the set of boundary conditions determined by employing the splice regression algorithm is super-imposed on to the first iteration of clustering. Thus, a modified k-means algorithm is generated by the restrictive clustering module that is substantially trained owing to the set of boundary conditions applied thereon. The modified k-means algorithm is employed to perform the second iteration of clustering.

Additionally, the second iteration of clustering has the error value lower than the error value for the first iteration of clustering. Specifically, the term 'error value' is an indicative of an increase in uncertainty in the clustering of the set of datapoints. Specifically, an increase in uncertainty in the clustering of the set of datapoints indicate incorrect classification (namely, clustering) of the set of datapoints. The error value refers to a value obtained upon analysis of clusters generated upon clustering of the set of datapoints in the multi-dimensional space. Specifically, the error value characterizes an uncertainty for the clusters generated by the system. Optionally, the error value is a numerical value, an alphabetical grade, a rating, a ranking, a percentage, and so forth.

Moreover, the error value of the second iteration of clustering formed by employing optimal cluster centers is substantially lower than the error value of the first iteration of clustering owing to supervised training of algorithms employed for clustering of the set of datapoints. Beneficially, such supervised training is not implemented using labelled training dataset. Therefore, the system eliminated a need of human intervention for generation of training dataset for supervised training and further saves time against generation of the training dataset.

Moreover, optionally, the restrictive clustering module further performs subsequent iterations to cluster the set of data points plotted in the multi-dimensional space reliably. In this regard, the restrictive clustering module performs iterations on the second iteration of clustering so as to add a weight to each cluster determined in the subsequent iteration for clustering, wherein the weight is employed to determine resultant clusters for the set of datapoints.

Optionally, the restrictive clustering module further re-iterates the second iteration of clustering based on an input provided by a user. More optionally, the input provided by the user is based on at least one of: the optimal number for cluster thresholds, the optimal number for segment thresholds, the error value. Moreover, optionally, the restrictive clustering module re-calibrates the machine learning algorithm employed by it. Specifically, the input provided by the user is backpropagated as a feedback to the restrictive clustering module It will be appreciated that any error identified by the restrictive clustering module in the resultant clusters for the set of datapoints is also back-propagated as feedback thereto. Specifically, the term "error" refers to a deviation of the generated resultant clusters from a desired resultant clusters. In an instance, the error is measure in terms of percentage.

Optionally, the neural network model (based on the machine learning algorithms) of the modules of the server arrangement are re-calibrated so as to decrease uncertainty in output generated by the system based on the error and/or the input provided by the user. In an instance, the server arrangement operates to re-calibrate the modules till the resultant clusters generated by the system is, for example, at least 95% accurate Optionally, the server arrangement stores the second iteration of clustering comprising resultant clusters, in the database arrangement. Optionally, the server arrangement is operable to provide the second iteration of clustering comprising resultant clusters to the user. In this instance, the second iteration of clustering is provided (namely, displayed) at a user device employed by the user. In another instance, the second iteration of clustering is communicated (namely, sent) to a communicating address (namely, e-mail address, inter-organizational network address, electronic messages) to the user.

The present disclosure also relates to the method as described above. Various embodiments and variants disclosed above apply mutatis mutandis to the method.

Optionally, the method further comprises re-iterating the second iteration of clustering based on an input provided by a user.

Optionally, the input provided by the user is based on at least one of: the optimal number for cluster thresholds, the optimal number for segment thresholds, the error value.

DETAILED DESCRIPTION OF THE DRAWINGS

Figure 1:
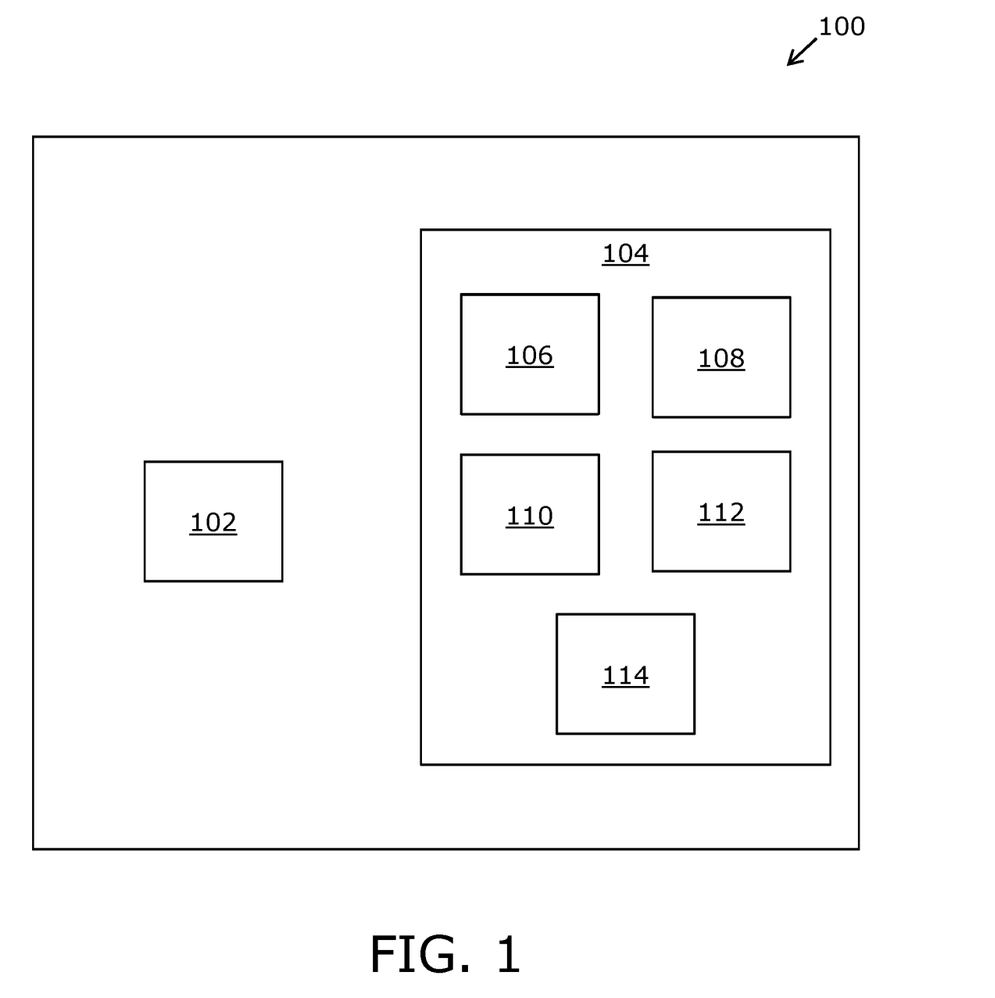
FIG. 1 is a schematic illustration of a system for restrictive clustering of datapoints, in accordance with an embodiment of the present disclosure.

Referring to FIG. 1, there is shown a schematic illustration of a system 100 for restrictive clustering of datapoints, in accordance with an embodiment of the present disclosure. The system comprises a database arrangement 102 and a server arrangement 104. The server arrangement 104 is communicably coupled via a data communication network (not shown) to the database arrangement 102. The server arrangement 104 comprises an extraction module 106, a mapping module 108, a clustering module 110, a regression module 112 and a restrictive clustering module 114. Notably, the extraction module 106 acquires at least one data record for performing clustering operation thereupon, from the database arrangement 102. The mapping module 108 determines a set of datapoints for the at least one data record, and plots the set of datapoints in a multi-dimensional space. Moreover, the clustering module 110 determines a cluster threshold based on iterative operation of the clustering module and performs a first iteration of clustering on the set of datapoints plotted in the multi-dimensional space. Furthermore, the regression module 112 determines a segment threshold for the set of datapoints plotted in the multi-dimensional space, based on iterative operation of the regression module and derives a set of boundary conditions for determining segments based on the segment threshold. Additionally, the restrictive clustering module 114 superimposes the set of boundary conditions corresponding to each of the segments based on the segment threshold thresholds onto the first iteration of clustering on the set of datapoints, and re-iterates the first iteration of clustering to obtain a second iteration of clustering. Notably, the second iteration of clustering has an error value lower than an error value for the first iteration of clustering.

FIG. 1 is merely an example, which should not unduly limit the scope of the claims herein. It is to be understood that the simplified illustration of the system 100 for supervised clustering of datapoints is provided as an example and is not to be construed as limiting the system 100 to specific numbers, types, or arrangements of the processing arrangement. A person skilled in the art will recognize many variations, alternatives, and modifications of embodiments of the present disclosure.

Figure 2A:
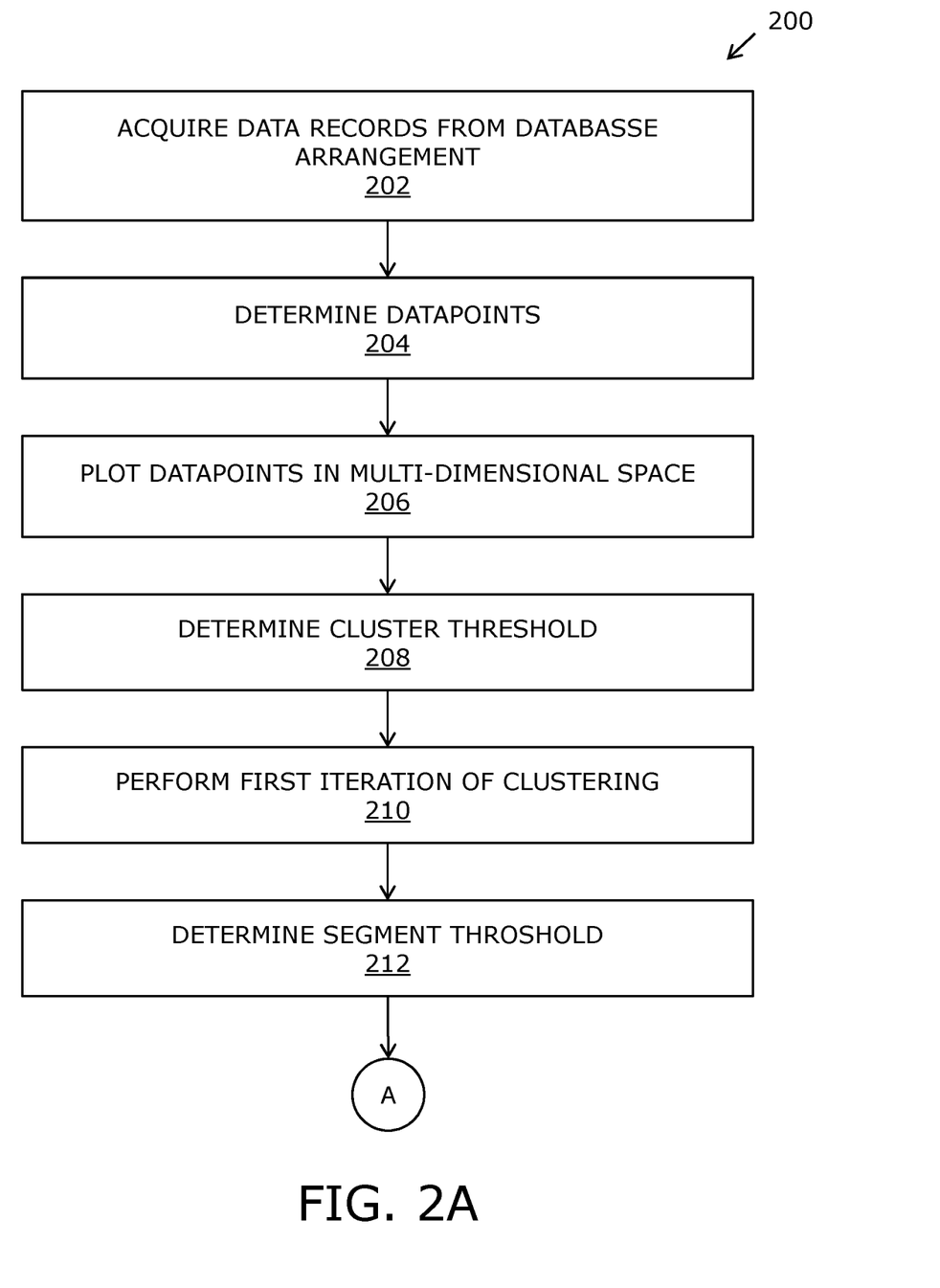
FIGS. 2A and 2B collectively illustrate a flow chart depicting steps of a method for restrictive clustering of datapoints, in accordance with an embodiment of the present disclosure.
Figure 2B:
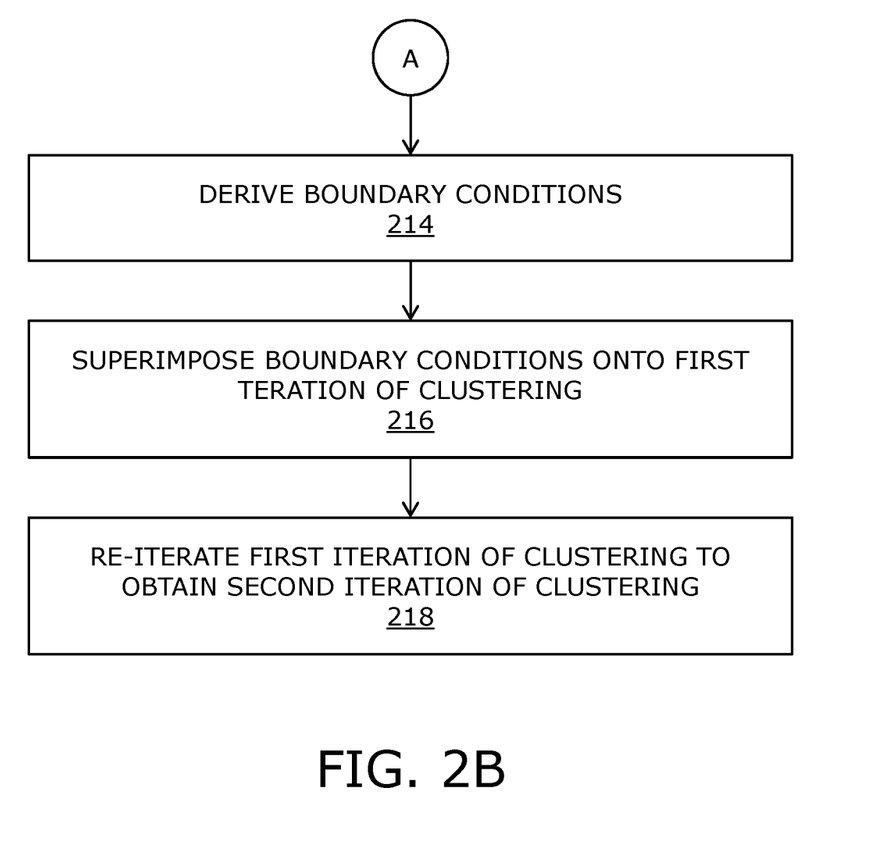

Referring to FIGS. 2A and 2B, there is shown a flow chart depicting steps of a method 200 for supervised clustering of datapoints, in accordance with an embodiment of the present disclosure. The method 200 is depicted as a collection of steps in a logical flow diagram illustrated collectively by FIGS. 2A and 2B, which represents a sequence of steps that can be implemented in hardware, software, or a combination thereof, for example as aforementioned.

The method 200 for supervised clustering of datapoints is implemented using a system comprising a server arrangement communicably coupled via a data communication network to a database arrangement. At a step 202, at least one data record is acquired for performing clustering operation thereupon from the database arrangement. At a step 204, a set of datapoints are determined for the at least one data record. At a step 206, the set of datapoints are plotted in a multi-dimensional space. At a step 208, a cluster threshold is determined. At a step 210, a first iteration of clustering is performed on the set of datapoints plotted in the multi-dimensional space. At a step 212, a segment threshold is determined for the set of datapoints plotted in the multi-dimensional space. At a step 214, a set of boundary conditions is derived for determining segments based on the segment threshold. At a step 216, the set of boundary conditions corresponding to each of the segments based on the segment threshold is superimposed onto the first iteration of clustering on the set of datapoints. At a step 218, the first iteration of clustering is re-iterated to obtain a second iteration of clustering. Herein, the second iteration of clustering has an error value lower than an error value for the first iteration of clustering.

The steps 202, 204, 206, 208, 210, 212, 214, 216, and 218 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A system for restrictive clustering of datapoints, wherein the system comprises:
    a database arrangement; and
    a server arrangement communicably coupled via a data communication network to the database arrangement, wherein the server arrangement comprises:
        an extraction module, that when operated, acquires at least one data record for performing clustering operation thereupon, from the database arrangement;
        a mapping module, that when operated, determines a set of datapoints for the at least one data record, and plots the set of datapoints in a multi-dimensional space, wherein the multi-dimensional space is plotted to depict a variation of at least one dependent variable against a variation of an independent variable, and wherein the set of datapoints provides values relating to the variation of the at least one dependent variable against the variation of the independent variable;
        a clustering module employing a machine learning algorithm which is implemented as an unsupervised learning algorithm, that when operated:
            determines a cluster threshold based on iterative operation of the clustering module; and
            performs a first iteration of clustering on the set of datapoints plotted in the multi-dimensional space;
        a regression module employing a machine learning algorithm which is implemented as a supervised learning algorithm, that when operated:
            determines a segment threshold for the set of datapoints plotted in the multi-dimensional space, based on iterative operation of the regression module; and
            derives a set of boundary conditions for determining segments based on the segment threshold; and
        a restrictive clustering module, that when operated:
            superimposes the derived set of boundary conditions corresponding to each of the segments based on the segment threshold onto the first iteration of clustering, on the set of datapoints; and
            re-iterates the first iteration of clustering by utilizing the superimposed set of boundary conditions to obtain a second iteration of clustering, wherein the second iteration of clustering has an error value lower than an error value for the first iteration of clustering.

2. The system of claim 1, wherein machine learning algorithms are employed by at least one of the: extraction module, mapping module, clustering module, regression module, restrictive clustering module.

3. The system of claim 2, wherein the clustering module, employing the machine learning algorithms, employs k-means algorithm for operation thereof.

4. The system of claim 2, wherein the regression module, employing the machine learning algorithms, employs splice regression algorithm for operation thereof.

5. The system of claim 1, wherein the restrictive clustering module further re-iterates the second iteration of clustering based on an input provided by a user.

6. The system of claim 5, wherein the input provided by the user is based on at least one of: the optimal number for cluster thresholds, the optimal number for segment thresholds, the error value.

7. A method for supervised clustering of datapoints, the method is implemented using a system comprising a server arrangement communicably coupled via a data communication network to a database arrangement, wherein the method comprises:
    acquiring at least one data record for performing clustering operation thereupon from the database arrangement;
    determining a set of datapoints for the at least one data record;
    plotting the set of datapoints in a multi-dimensional space, wherein the multi-dimensional space is plotted to depict a variation of at least one dependent variable against a variation of an independent variable, and wherein the set of datapoints provides values relating to the variation of the at least one dependent variable against the variation of the independent variable;
    determining, a cluster threshold;
    performing a first iteration of clustering on the set of datapoints plotted in the multi-dimensional space by employing a machine learning algorithm which is implemented as an unsupervised learning algorithm;
    determining a segment threshold for the set of datapoints plotted in the multi-dimensional space;
    deriving a set of boundary conditions for determining segments based on the segment threshold by employing a machine learning algorithm which is implemented as a supervised learning algorithm;
    superimposing the derived set of boundary conditions corresponding to each of the segments based on the segment threshold onto the first iteration of clustering on the set of datapoints; and
    re-iterating the first iteration of clustering by utilizing the superimposed set of boundary conditions to obtain a second iteration of clustering, wherein the second iteration of clustering has an error value lower than an error value for the first iteration of clustering.

8. The method of claim 7, wherein the method further comprises re-iterating the second iteration of clustering based on an input provided by a user.

9. The method of claim 8, wherein the input provided by the user is based on at least one of: the optimal number for cluster thresholds, the optimal number for segment thresholds, the error value.

10. A computer program product comprising non-transitory computer-readable storage media having computer-readable instructions stored thereon, the computer-readable instructions being executable by a computerized device comprising processing hardware to execute a method of claim 7.

* * * * *